(No Model.)

S. HUGHES.
RAILWAY CAR VENTILATOR.

No. 490,388. Patented Jan. 24, 1893.

Witnesses:
Chas. Raley.
Arthur Cantin.

Samuel Hughes
Inventor
By A. Harvey
Attorney.

UNITED STATES PATENT OFFICE.

SAMUEL HUGHES, OF LINDSAY, CANADA.

RAILWAY-CAR VENTILATOR.

SPECIFICATION forming part of Letters Patent No. 490,388, dated January 24, 1893.

Application filed January 14, 1891. Serial No. 377,772. (No model.)

*To all whom it may concern:*

Be it known that I, SAMUEL HUGHES, of Lindsay, in the Province of Ontario, in the Dominion of Canada, have invented certain new and useful Improvements in Railway-Car Ventilators; and I do hereby declare that the following is a full, clear, and exact description of the same, reference being had to the accompanying drawings, forming a part hereof.

My invention, which will be hereinafter fully set forth and claimed, relates to devices for supplying, purifying, cooling, warming and extracting air from railway carriages.

The object of my invention is to supply to railway carriages air free from dust and cinders, cool in summer and warm in winter and to expel the vitiated air and to effect the necessary changes without causing objectionable drafts.

Figure 1:
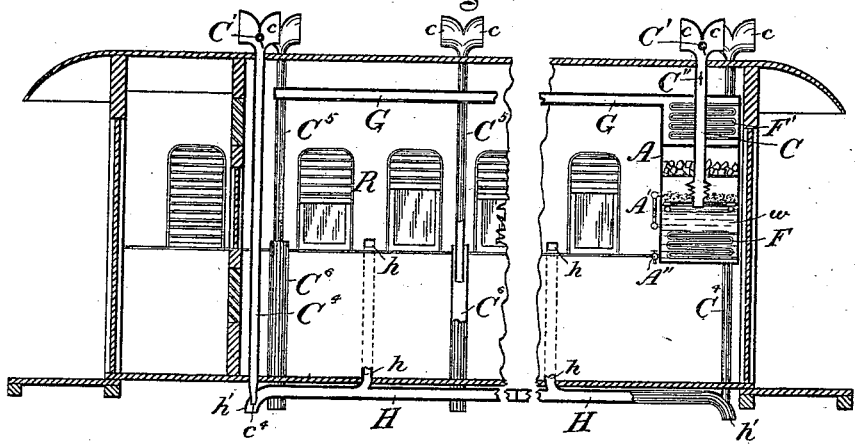
Figure 2:
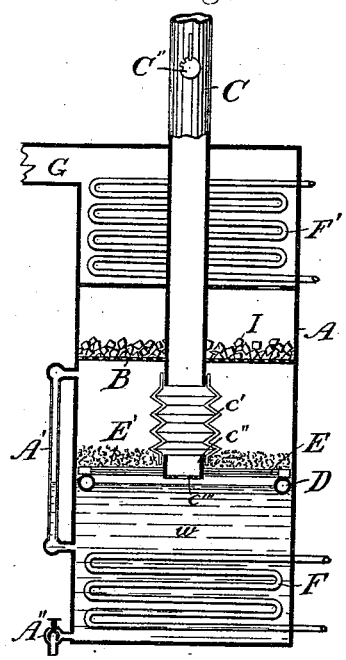

Figure 1 is a longitudinal section of a railway carriage, showing my invention. Fig. 2 is an enlargement of a portion of Fig. 1, showing the air-supply apparatus.

In a convenient corner or other part of a carriage, R, Fig. 1, I place a tank A adapted to be partly filled with water, $w$. Some distance above the highest intended water level in said tank is fitted a cooling chamber with perforated or grated bottom B, adapted to carry cooling material, I.

C is a fresh air tube passing through the roof of the carriage and terminating above the roof in a trumpet mouthed twin funnel $c\ c$, one mouth facing forward and one rearward. At the point where the trunk of the tube branches out into twin shape, a flap valve C' is fitted, adapted to close either one or the other of the two throats. A regulating valve C'' may be placed in the tube lower down. The trunk of the tube C passes through the cooling chamber and ice rack, below which it has inserted a flexible or bellows joint $c'$, leaving a short end $c''$ of the tube, the mouth of which is closed with a perforated plate $c'''$ having a large perforation in the center. The end $c''$ passes through, and is secured in, the perforated bottom E which is carried upon a float D a little distance above the surface of the water. The float may be of tubular (as shown) or any other construction. Upon the false bottom E is a placed Florida moss, horsehair, shavings or other loose, light material E', to check the splashing of the water and act as a filter for the air passing through it. The water space may be fitted with heating coils F for warming the water by steam, hot water, hot air or the like, in order to prevent freezing; similar coils F' may also be placed in the upper part of the tank above the cooling chamber, or in a separate chamber that may be connected with the tank A. The heating space containing the coils F' communicates freely with the cooling space and from said heating space the air is discharged through perforated pipes G G, running along the upper part of the carriage. The tank is also fitted with watergage A' and draw-off-cock A''.

The device as far as described operates as follows: In warm weather cooling material I is placed in the cooling chamber B and water $w$ in the bottom of the tank A, the heater F and F' being unused during that season. When the car is in motion, the forward facing trumpet mouth $c$ presses against the air and causes a current to be forced down the tube C $c'$ $c''$ through the strainer $c'''$ upon the surface of the water $w$. The heavier impurities of the air are retained by the water and the partly purified air passes upward through the perforated bottom E, and the wet filtering material E' and through the cooling chamber where it is cooled and finally discharged into the perforated pipes G G. In cold weather cooling material is not used, but the water $w$ and the chamber A' may be warmed by means of the coils F and F' or in some other convenient manner. As the float D rises and falls with the surface of the water $w$, the distance between said surface and the strainer $c'''$ in the discharge mouth of the air tube is always kept uniform, but the tube end $c''$ may be set higher or lower in the bottom E at pleasure.

For expelling the vitiated air, I use tubes H, one along each side of the car and each closed at one end or if double ended, as shown in the drawings, in the center, to form two tubes placed end to end. Said tubes are placed above or below the floor of the carriage and are provided between each pair of seats with a short branch $h$ rising some three feet or more above the floor, with which the air of the carriage freely communicates. One end $h'$ of each tube is turned down and communicates freely with the open air. Into each of these ends $h'$ is placed, ejector-like, a contracted end or nozzle $c^4$ of an upright blast pipe $C^4$, the upper parts of which are exactly like the tube C, having double trumpet mouths $c\ c$ above the roof, and valves $C'$, but without the flexible joint. Additional blast pipes $C^5$, similar to C and $C^4$, having their upper ends above the car roof and provided with double trumpet mouths $c\ c$ and valves $C'$, each having its lower end inserted in the upper open mouth of a larger tube $C^6$ having its lower end below the car floor, may be used, either to act as auxiliaries to the tubes H and $C^4$ or independently thereof. This system of ventilation operates by currents being forced down the blast pipes $C^4 c^4$, causing a partial vacuum in the ends $h'$, which is made good by the entrance of air from the car through the tubes $h$ passing along the tubes H and expelled at the discharge ends $h'$. Similarly, a current passes down each tube $C^5$, causing a partial vacuum in the blast pipe $C^6$, which is balanced by the entrance of air from the car at its open upper mouth and is expelled with the current at the lower discharge end.

I claim as my invention:—

1. In a ventilating system for railway carriages, the combination of a tank A having a waterspace, cooling space and air space, provided with water gage and draw-off cock, the cooling chamber B placed above the water space, the air tube C having a tight flexible joint $c'$ and end $c''$ and terminating at the top and above the roof of the car in a trumpet mouthed twin funnel $c\ c$ with flap valve $C'$, float D at the top of the water space supporting a false bottom, the perforated false bottom E supported by the float above the water level and carrying the lower end $c''$, of the air tube and the filtering material $E'$, heating coils in the air space and perforated distributing tube G, substantially as set forth.

2. In a ventilating system for railway carriages, the combination of the longitudinal pipe H near the floor of the carriage and having upwardly extending branches $h$ open at the top and downward projecting ends $h'$ connecting with the open air, vertical blast pipes $C^4$ terminating above the roof in trumpet mouthed twin funnels having flap valves and having their lower ends contracted into nozzles $c^4$ which are inserted in the ends $h'$ to form ejectors, substantially as set forth.

In testimony whereof I have signed in the presence of the undersigned witnesses.

SAMUEL HUGHES.

Witnesses:
JOHN R. McDONALD,
GEORGE H. NEWTON.